United States Patent [19]

Tuerck

[11] 4,079,442
[45] Mar. 14, 1978

[54] SIDE MARKER AND CLEARANCE LAMP AND MOUNTING APPARATUS THEREFOR

[75] Inventor: Christian F. Tuerck, Cincinnati, Ohio

[73] Assignee: K-D Lamp Company, Cincinnati, Ohio

[21] Appl. No.: 710,457

[22] Filed: Aug. 2, 1976

[51] Int. Cl.² ............................................. B60Q 1/32
[52] U.S. Cl. ...................................................... 362/80
[58] Field of Search .................... 240/8.2, 8.22, 7.1 R, 240/8.24, 8.26, 8.3; 248/216.2, 216.3; 85/DIG. 2

[56] References Cited

U.S. PATENT DOCUMENTS

| | | | |
|---|---|---|---|
| 2,745,521 | 5/1956 | White | 85/DIG. 2 |
| 3,087,051 | 4/1963 | Black | 240/7.1 R |
| 3,184,590 | 5/1965 | Nagel | 240/8.2 X |
| 3,187,172 | 6/1965 | Knapp et al. | 240/8.2 |
| 3,400,262 | 9/1968 | Newman | 240/8.2 |
| 3,735,116 | 5/1973 | Morrison | 240/8.2 |

*Primary Examiner*—Richard L. Moses
*Attorney, Agent, or Firm*—Wood, Herron & Evans

[57] ABSTRACT

Apparatus for mounting components, such as light assemblies, to a base, such as a vehicle, includes a positioning element having a boss for positioning engagement with the component, and stud means cooperating with predrilled holes in the base. Fastener openings in the component are spatially located to correspond with the predrilled holes and with the studs. The studs are frangible so that in use, the positioning element is applied to the base, the boss in predetermined position with respect to the holes. The component is then applied to the positioning element and is positioned by the boss so that its fastener openings are registered over the studs and the predrilled holes. Screw fasteners are threaded through the component and bear against the studs, breaking them, pushing them through the predrilled holes, and operatively connecting the component to the base. The boss is provided with electrical conductor receiving grooves and, where the component is a light assembly, the component includes a conductor piercing prong, electrically connected to a lamp, for connection to a conductor in one of the grooves.

20 Claims, 7 Drawing Figures

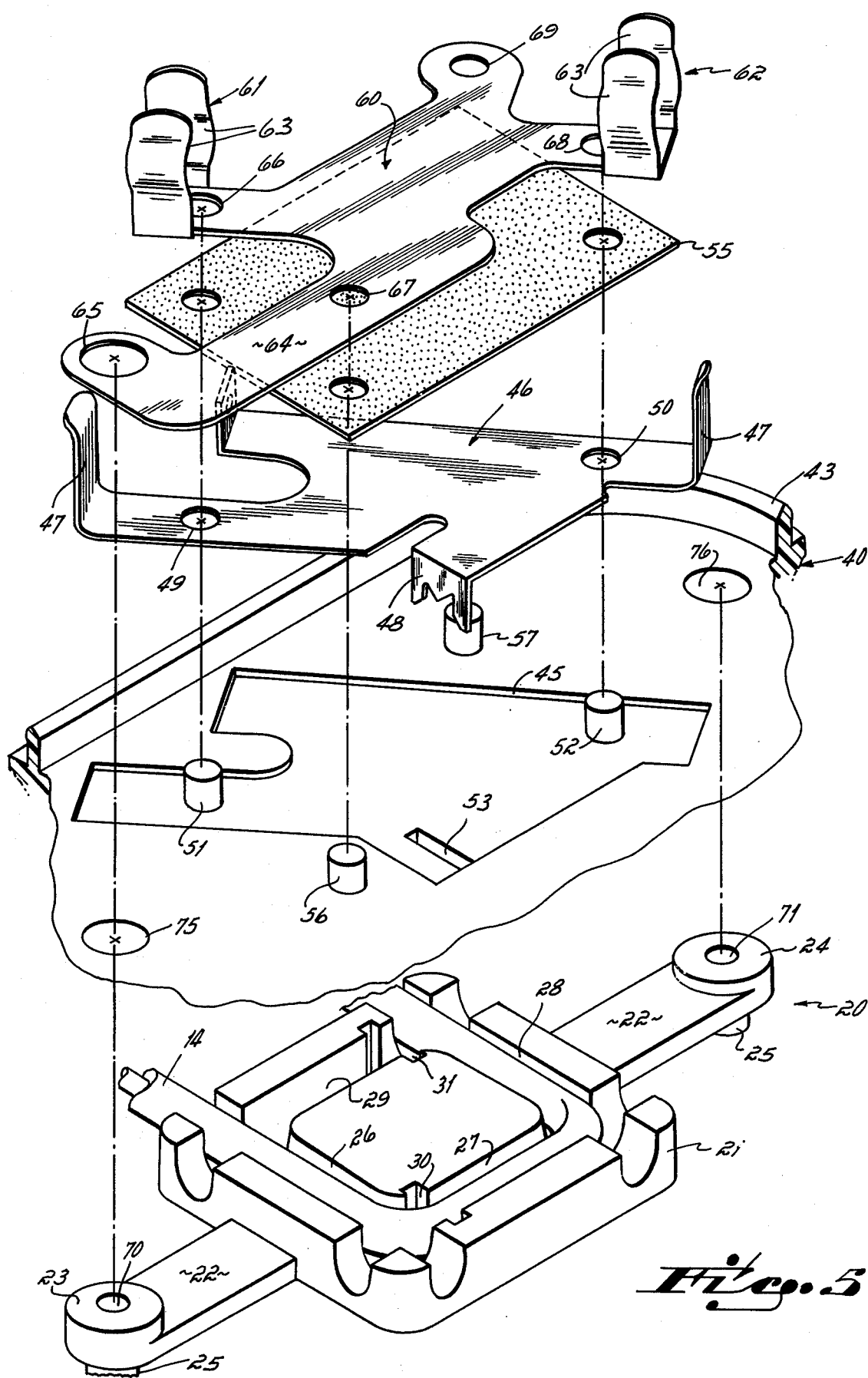

SIDE MARKER AND CLEARANCE LAMP AND MOUNTING APPARATUS THEREFOR

This invention relates to component mounting apparatus and more particularly to apparatus for securing a marker or clearance lamp assembly to a vehicle body.

Marker lights for vehicles, including trailer bodies, have been wired, connected and mounted in numerous ways. In U.S. Pat. No. 3,400,262, for example, prior mounting methods are disclosed, as well as apparatus including an adhesive backed insert for receiving electrical conductors and over which a lamp is assembled. The apparatus disclosed in that patent, however, is subject to several disadvantages. Particularly, the insert must be accurately positioned with respect to any holes predrilled in the vehicle for mounting of the lamp. If the insert is out of place, the lamp will not register with the holes. Thus, the apparatus disclosed is difficult to use in the case where light mounting holes are to be predrilled.

At the same time, however, mounting of lights to vehicles is facilitated by the concept of electrically connecting the lamp to appropriate wiring incident to assembly of the lamp to the vehicle. Where conductor piercing elements, such as prongs, are utilized to pierce the conductor insulation and to electrically connect the lamp to the conductor, it is desirable to provide conductor positioning means for maintaining the conductor in a proper position for the piercing elements. While the insert disclosed in the aforementioned patent provides this function to some extent, it is still subject to the above disadvantage of difficult use in the situation where the mounting holes are predrilled.

Accordingly, it is one objective of the invention to provide component mounting apparatus useful to accurately and consistently position components with respect to predrilled holes in a base member.

A further objective of the invention has been to provide improved mounting apparatus for facilitating the assembly of lamps to vehicle bodies.

A still further objective of the invention has been to provide apparatus for accurately mounting lamps on vehicle bodies in register with predrilled holes therein and for facilitating electrical connection of lamps to appropriate electrical conductors incident to such mounting.

To these ends, a preferred embodiment of the invention includes a positioning means comprising a lamp support positioning boss member and two hollow, frangible stud means projecting therefrom. The studs are insertable into predrilled holes in a trailer body and the boss member is thus positioned with respect to the holes. A lamp support means has a boss receiving recess and fastener openings spatially corresponding to the predrilled holes. This support is placed over the boss which positions the support and accurately places the fastener openings in respective register with the studs and the predrilled holes. Screw fasteners are inserted into the openings and are threaded into the hollow stud means, at which time the studs break away from the positioning means and permit the screws to operatively fasten and connect the lamp support to the trailer body.

To facilitate electrical connection, one lamp terminal connecting plate on the lamp support is provided with a conductor piercing prong operatively associated with a conductor receiving groove in the boss of the positioning means. Where the support is pressed onto the positioning means, the prong pierces a conductor within the groove and electrically connects it to a lamp terminal conductor. Also, another lamp terminal conductor is extended adjacent to one of the fastener openings and electrically connects another lamp terminal to the trailer body via the screw fastener. Either a lamp support means or a jig is used to accurately predrill appropriately spaced holes in the trailer body.

Accordingly, the invention thus provides improved trailer light mounting apparatus facilitating the accurate mounting and connection of lamp assemblies to trailer bodies in conjunction with predrilled holes therein.

These and other objects and advantages will become readily apparent from the following detailed description of a preferred embodiment and from the drawings in which:

FIG. 5 is an exploded perspective view of a positioning means and lamp assembly according to the invention;

Figure 1:
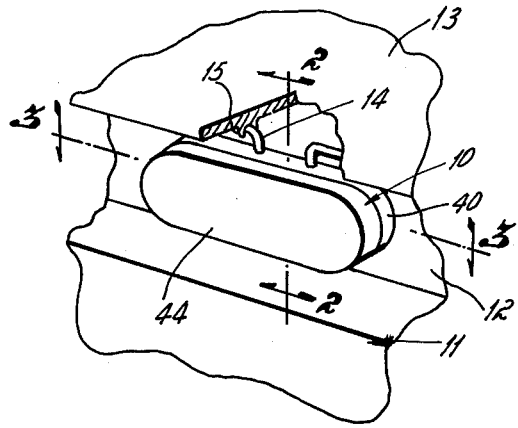
FIG. 1 is a broken away perspective showing a lamp assembly according to the present invention mounted in a channel member of a trailer body.

Turning now to the drawings, as shown in FIG. 1, a lamp apparatus 10 is mounted to a trailer body 11. While the apparatus described herein is useful for attaching or mounting components to various bases and surfaces, the preferred embodiment includes a lamp apparatus as shown in FIG. 1 mounted on an ordinary trailer body of the type having an upper extruded channel frame member 12 in which the marker or clearance lamp apparatus 10 is mounted. As shown in FIG. 1, the extruded channel 12 forms the junction between the trailer side wall and the trailer top 13, the trailer contemplated in FIG. 1 being an ordinary "fifth-wheel" or "semi" trailer now in common use for conveyance by tractors.

As shown in FIG. 1, the trailer body is provided with an electrical conductor 14 in or near the channel 12. The conductor 14 is typically an insulated electrical conductor and as shown may reside in a groove 15 formed in the extruded channel. In FIG. 1, a portion of the conductor 4 is shown pulled away from the groove and it is this portion to which the lamp assembly is electrically connected as will be described herein.

Positioning Means

Figure 7:
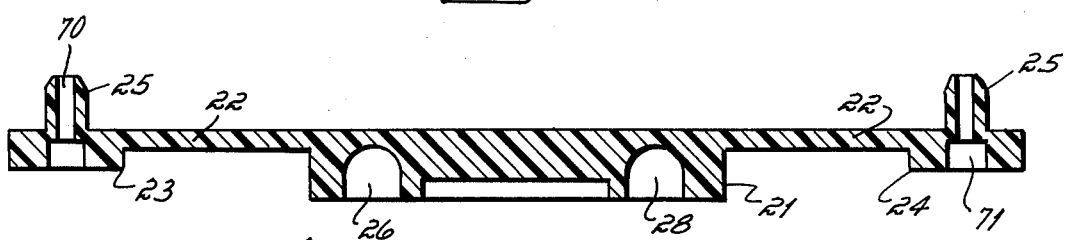
FIG. 7 is a cross-sectional view of a positioning means according to the invention.
Figure 4:
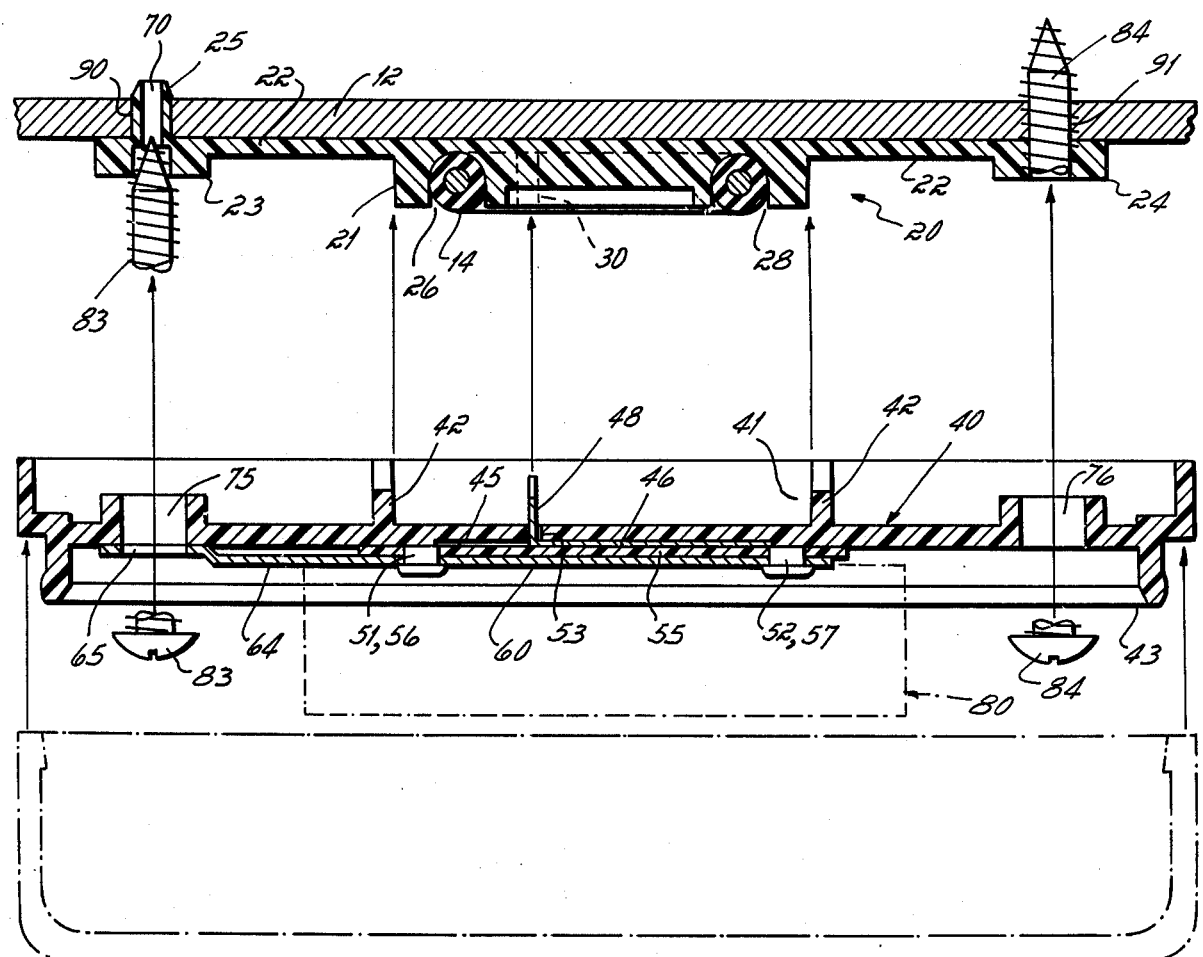
FIG. 4 is an exploded illustration of the view of FIG. 3.

The positioning means 20 is best seen in FIGS. 4, 5 and 7. As shown, the positioning means includes a raised boss member 21 and lateral extensions 22 on either side thereof extending outwardly of the boss member 21. Each of the extensions is provided with a respective hub 23 and 24. Further, each of the extensions is provided with an outwardly projecting stud 25. As will be appreciated, the studs 25 are, in a preferred embodiment, hollow as shown and are made from a material which is frangible so that the studs can be broken away from the extensions 22 and hubs 23 and 24.

In the preferred embodiment, the complete positioning means 20 can thus be formed integrally from a material such as plastic.

The boss member 21 further includes a plurality of electrical conductor/receiving grooves 26, 27, 28 and 29 which grooves extend completely around and in the boss 21 adjacent its periphery. Further, in a preferred embodiment, opposite grooves such as those at 27 and 29 are provided with slots 30 and 31, respectively, for receiving an electrical conductor piercing prong as will be described. Each of the grooves 26–29 is relatively deep and serves to positively position the flexible electrical conductor 14 therein in a plurality of different positions, one of which is as shown in FIG. 5. Electrical conductor 14 comprises an inner electrical conducting core and an outer insulating sleeve and the grooves 26–29 have a width which is approximately equal to the outside diameter of the insulative sleeve of the conductor 14 in order to rather firmly hold the conductor against sideways movement.

In use, the conductor 14 is placed within the boss 21, so that at least a portion of the conductor resides within groove 27 or groove 29. The conductor may run straight through one of these grooves, or may be bent as in FIG. 5.

Lamp Assembly and Support Means

Figure 2:
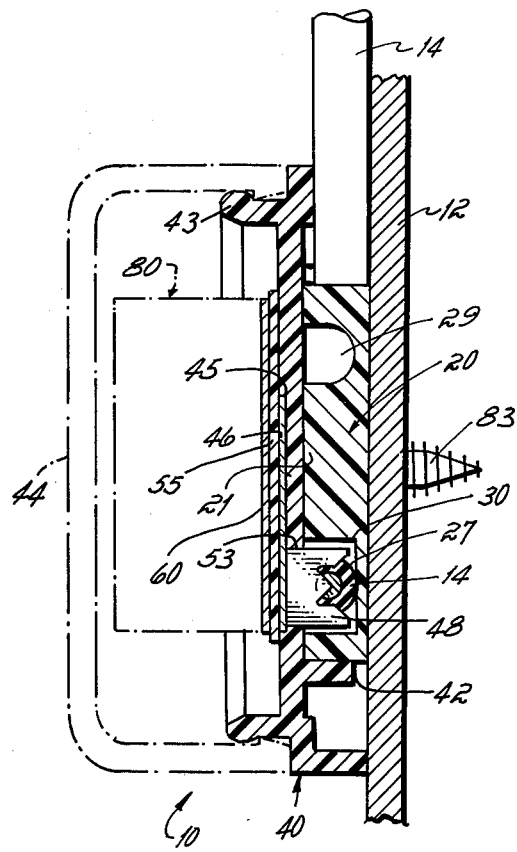
FIG. 2 is an enlarged cross-sectional view taken along lines 2—2 of FIG. 1.

The lamp assembly and support means is best seen in exploded form in FIGS. 4 and 5. It includes a base plate 40 generally made from a non-conductive material such as plastic. The base plate 40 is provided on its underside with a positioning recess 41 defined by shoulders 42 of the base plate. The structure of the recess 41 corresponds dimensionally to the boss 21 on the positioning means 20, and is constructed so that the boss 21 can be operatively received therein only when the base plate 40 is properly aligned. On its top side, the base plate 40 is further provided with a rim 43 to facilitate the mounting of a lens 44 as shown in FIGS. 1 and 2 and in phantom in FIGS. 3 and 4. Also, the base plate 40 is provided with a recess 45 dimensionally constructed to receive a first lamp terminal connecting plate 46.

Lamp terminal connecting plate 46 is electrically conductive and includes lamp terminal engaging members 47 and an electrical conductor piercing and connecting prong means 48. The connecting plate 46 is further provided with apertures 49 and 50 for receiving upstanding securing posts 51 and 52. When assembled to the base plate 40, the first lamp terminal connecting plate is positioned within the recess 45 such that the prong 48 extends downwardly through the base plate 40 via slot 53, and into the boss receiving recess 41 as best shown in FIG. 4.

The lamp support means further includes a sheet of insulating material 55 having appropriate apertures therein for receiving upstanding securing posts 51, 52 and 56 and 57.

Further, the lamp support means includes a second lamp terminal connecting plate 60. The connecting plate 60 is also electrically conductive and includes two lamp terminal engaging portions 61 and 62, each of which comprise a bifurcated member having electrically conducting ears 63 for engaging and supporting a light bulb B (not shown in FIG. 5) therein. In addition, the terminal connecting plate 60 includes an electrically conductive extension 64 having an aperture 65 therein. The terminal connecting plate 60 is provided with apertures 66, 67, 68 and 69 for connection to the upstanding securing posts 51, 56, 52 and 57 of the base plate 40 respectively.

Figure 6:
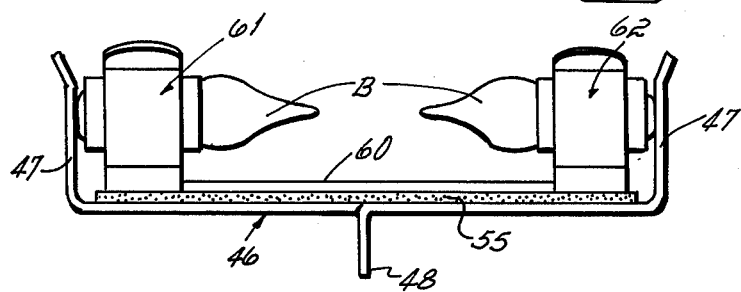
FIG. 6 is a side view of the mounted lamps and terminal connecting plates the position of which is indicated in phantom box in FIGS. 2, 3 and 4.

The finished assembly of the connecting plates 46 and 60, the insulating member 55 and the bulbs B are shown in detail in FIG. 6. In FIG. 6, ears 63 surround and engage the socket of the bulbs B, while the lamp terminal engaging members 47 engage merely the rearward terminal of the bulbs. As shown, insulating member 55 serves to completely insulate the first lamp terminal connecting plate 46 from the second lamp terminal connecting plate 60.

When the lamp apparatus is to be assembled, the plates 46, 60 and insulating sheet 55 are assembled to the base plate 40 over the respective upstanding non-conductive securing posts 51, 56, 52 and 57. In the event that the base plate 40 is made from some plastic material, the upstanding securing posts are formed integrally therewith. Once the various terminal plates 46 and 60 and the insulating sheet are placed over the studs, the top of the studs can be crimped, melted, or otherwise deformed, as shown in FIG. 4, so as to secure the sandwich of the plates 46 and 60 and the insulated sheet 55 to the base plate 40.

As shown in FIG. 5, it will be appreciated that hollow portions or passageways 70 and 71, of the respective studs 25, extend through the hubs 23 and 24. Base plate 40 is also provided with fastener openings 75 and 76, and these fastener openings are aligned with, and are generally concentric about, the same axis as the studs 25 and the passageways 70 and 71, respectively. Furthermore, aperture 65 on the second terminal connecting plate 60 is also aligned with the fastener opening 75, and passageway 70 in the hub 23.

Figure 3:
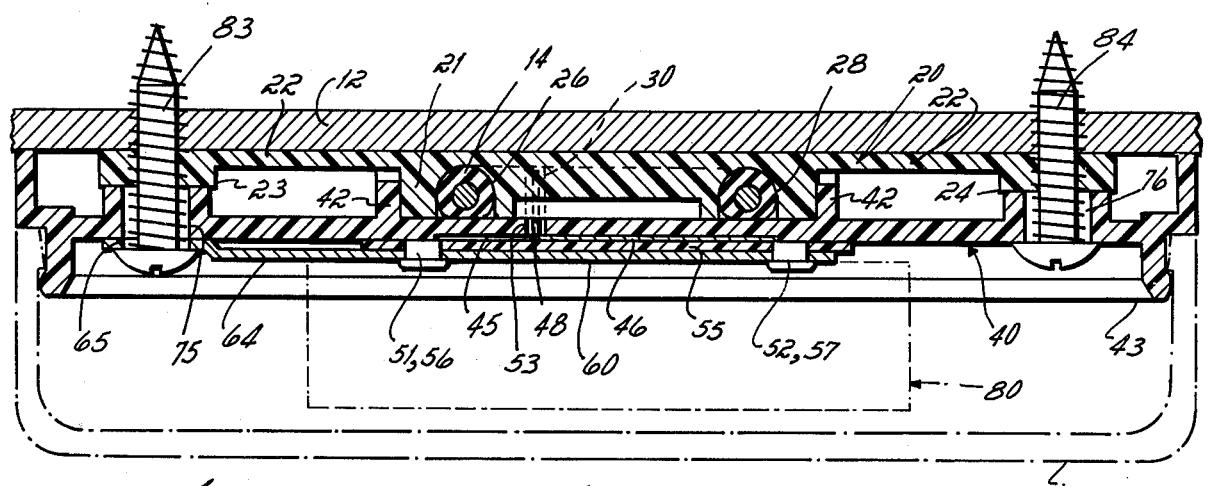
FIG. 3 is an enlarged cross-sectional view taken along lines 3—3 of FIG. 1.

In order to facilitate understanding of the structure of the apparatus, the bulbs B and the bulb sockets comprising the ears 63 and the terminal engaging portions 47 are not shown in detail in FIGS. 2, 3 or 4. Instead the bulb mounting apparatus shown in FIG. 6 is indicated in phantom lines 80 in FIGS. 2, 3 and 4.

As best seen in FIGS. 3 and 4, each lamp assembly is provided with two fastener means, such as electrically conductive screws 83 and 84. As seen in FIG. 3, the extension 64 of the terminal connecting plate 60 extends in the direction of fastener 83 so that when the fastener is in place, it not only serves to mount the lamp apparatus to the trailer body 11 at extrusion, but serves to electrically connect the second lamp terminal connecting plate 60 to the electrically conductive extrusion. In the preferred embodiment, the trailer body 11 is electrically grounded, through a common ground, to an electrical source, the conductor 14 being connected to a positive terminal of the electrical source. Thus, the electrical connection to ground of the bulbs B is via ears 63, plate 60, extension 64, fastener 83 and trailer body 11. In this regard, when the apparatus, as shown in FIG. 3, is mounted, studs 25 have been completely displaced from the positioning means 20 so that the fasteners 83 and 84 securely connect the base plate 40 to the trailer body 11 through the hubs 23 and 24 of the positioning means and, in the case of fastener 83, electrically connect and ground the plate 60 to the trailer body 11.

The apparatus described herein is used as follows. First, desirable lamp positions are noted and the conductor 14 associated with the trailer body is positioned such as in a loop, for example, to permit connection of the lamp thereto. A jig is utilized to predrill holes such as at 90 and 91 in the extrusion 12. The center lines of the holes in the jig are spaced apart a distance equal to the spacing of the center lines of the fastener openings in the base plate 40 of the lamp apparatus to be assembled to the trailer body. Alternately, the fastener openings may be so constructed so that they in themselves can form a jig, the base plate thereby being used for such function. Thus, the trailer body is provided with two predrilled holes which bear a predetermined spatial relationship to the openings in the base plate 40, and as well bear a predetermined spatial relation to the projecting stud means 25 of the positioning means 20. Accordingly, when it is desired to mount the lamp apparatus to the trailer, the positioning means 20 is secured to the trailer simply by pushing the studs into the predrilled holes. The positioning means 20 is thus mounted to the extrusion 12 by a friction fit, the outer diameter of the studs being approximately equal to the diameter of the predrilled holes 90 and 91 in order to provide a friction fit therein. Thereafter, the electrical conductor 14 is inserted into at least one of the grooves 27 or 29 and, as shown in the drawings, is looped in a preferred embodiment through grooves 26, 27, and 28. Following this, the base plate 40 and the complete lamp assembly mounted thereon is attached to the trailer body by the simple expedient of placing it over the positioning means 20 such that the recess 41 receives the boss 21. Since the boss and the recess are correspondingly dimensionally constructed, the boss 21 serves to position the base plate 40 over the positioning means 20 such that the fastener opening 75 and 76 are in accurate register with respect to the predrilled holes 90 and 91. Thereafter, screws are inserted through the openings 75 and 76 and through the hubs 23 and 24 of the positioning means 20. As the screws, which may be self-threading, are advanced, the frangible positioning studs 25 are displaced or broken off from the hubs 23 and 24 of the positioning means 20, and are pushed through the predrilled holes. They thus do not interfere with the structural mounting of lamp assembly to trailer, nor with electrical connection of lamp assembly to trailer via the fasteners. The outside thread diameter of the screw fasteners is larger than the predrilled holes and thus the fasteners are operable to positively secure the base plate 40 and the lamp assembly to the extrusion 12. Thereafter, and assuming the bulbs are in place, the lens 44 is fitted over the retaining rib of rim 43 and the assembly of the lamp is completed.

Incident to this assembly, it will be appreciated that piercing prong 48 is registered with one of the slots 30 or 31, in this case slot 30, and as the screw fasteners are advanced, the prong 48 pierces the insulation and electrically connects the conductor 14 to the first lamp terminal connecting plate 46. Accordingly, the rearward-most terminal of the lamps is electrically connected to the conductor 14 via the lamp terminal engaging members 47, plage 46 and the prong 48.

Accordingly, the positioning means disclosed herein serves to accurately position a mountable component with respect to predrilled holes and, in the case of the preferred embodiment, a lamp assembly to the predrilled holes in a vehicle body, for example. Furthermore, is serves to positively position a flexible electrical conductor for engagement by a conductor piercing and connecting prong member for connecting the lamp of the assembly to a source of electrical supply. It is therefore feasible to predrill holes in the trailer body such that assembly of the lamp apparatus thereto can be later completed without any further drilling or fitting, that is, other than placing the positioning means 20 between the holes as determined by the studs 25 and thereafter positioning conductor 14 and advancing the fasteners 83 and 84. In this manner, the mounting holes can be predrilled in the trailer and the positioning means accurately placed without any difficulty in registering the positioning means with respect to the holes, this being done automatically by the studs.

It should further be appreciated that while the invention disclosed herein has been described in connection with its adaptation to mounting a trailer light assembly, the frangible positioning stud apparatus is adaptable to other mounting functions as well.

These and other advantages and modifications will become readily apparent to one of ordinary skill in the art without departing from the scope of the invention, and applicant intends to bound only by the claims appended hereto.

I claim:
1. A light assembly for a vehicle body including:
   a positioning means,
   a lamp support means having spaced apart fastener receiving openings,
   means for registering said lamp support means in a predetermined position on said positioning means when said positioning means is assembled to a vehicle body,
   said vehicle body having predrilled holes therein and said fastener openings spatially corresponding in position to said predrilled holes when said lamp support means is said predetermined position on a positioning means assembled to a vehicle body, and
   said positioning means having spaced positioning stud means extending therefrom and spatially corresponding to the position of said predrilled holes for insertion therein to position said positioning means with respect to said predrilled holes.
2. A light assembly as in claim 1 wherein said stud means are frangible to permit displacement of same incident to insertion of fasteners through said fastener openings and against said stud means, and to permit said lamp support means to be operatively mounted to said vehicle body in a position determined by said predrilled holes and by said positioning means.
3. A light assembly as in claim 2 wherein said lamp support means includes a positioning recess and wherein said positioning means comprises a boss member for insertion into said recess to position said lamp support means over said positioning means and to locate said fastener openings in register with said predrilled holes and with said stud means.
4. A light assembly as in claim 3 wherein said boss member includes electrical conductor receiving grooves.
5. A light assembly as in claim 4 wherein said lamp support means includes at least one conductor piercing and connecting prong and wherein said boss member further includes a prong receiving slot operatively associated with a conductor receiving groove.
6. A light assembly as in claim 2 wherein said frangible stud means are hollow.
7. A light assembly as in claim 2 wherein said stud means have an outer diameter approximately equal to that of said predrilled holes to provide a friction fit therein.
8. A light assembly as in claim 7 including screw fastener means having an outside thread diameter greater than the outside diameter of said stud means.

9. A light assembly as in claim 2 wherein said positioning means further comprises stud bearing extensions extending outwardly of said boss member.

10. A light assembly as in claim 2 wherein said lamp support means comprises:
   a base plate,
   a first lamp terminal connecting plate thereon and having an electrical conductor piercing and connecting prong connected thereto,
   a second lamp terminal connecting plate, and
   insulation means between said terminal plates.

11. A light assembly as in claim 10 wherein said positioning means includes a boss member having electrical conductor receiving grooves therein, said piercing and connecting prong being in operative register with one of said grooves when said lamp support means is operatively positioned over said positioning means.

12. A light assembly as in claim 11 wherein said second lamp terminal connecting plate is electrically connected and grounded to said vehicle body by one of said fastener means.

13. A positioning apparatus for positioning mountable components, such as a light assembly, to a mounting base, such as a vehicle, having predrilled holes therein which correspond in position to fastener openings in said mountable components, said apparatus comprising:
   a positioning means,
   means on said positioning means for mounting a mountable component in predetermined position on said positioning means, and
   spaced frangible stud means projecting from said positioning means and spatially corresponding in position to said predrilled holes for insertion therein and for displacement from said positioning means upon insertion of fasteners into said fastener openings and against said stud means when a mountable component is in said predetermined position.

14. Apparatus as in claim 13 wherein said stud means are hollow.

15. Apparatus as in claim 13 wherein said stud means have an outside diameter approximately equal to the inside diameter of said predrilled holes to provide a friction fit therein.

16. Apparatus as in claim 15 wherein said mountable component includes a positioning recess and wherein said positioning means includes a boss member for insertion into said recess to position said mountable component thereon and to locate said fastener openings in register with said predrilled openings.

17. Apparatus as in claim 16 wherein said positioning means further includes stud bearing extensions extending outwardly of said boss member.

18. Apparatus as in claim 17 wherein said mountable component comprises an electrical light and wherein said boss member includes electrical conductor receiving grooves therein.

19. Apparatus as in claim 15 wherein said fasteners are screws having an outside thread diameter greater than the outside diameter of said stud means.

20. Apparatus as in claim 13 wherein said positioning means includes elongated grooves for receiving and positioning electrical conductors.

* * * * *